United States Patent
McCarthy, Jr. et al.

(10) Patent No.: US 11,300,061 B2
(45) Date of Patent: Apr. 12, 2022

(54) TWO STROKE ENGINE BRAKING VIA CYLINDER DEACTIVATION AND LATE INTAKE VALVE CLOSING

(71) Applicant: Eaton Intelligent Power Limited, Dublin (IE)

(72) Inventors: James E. McCarthy, Jr., Kalamazoo, MI (US); Dale Arden Stretch, Novi, MI (US); Mihai Dorobantu, Richland, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/251,972

(22) PCT Filed: Jun. 11, 2019

(86) PCT No.: PCT/EP2019/025176
§ 371 (c)(1),
(2) Date: Dec. 14, 2020

(87) PCT Pub. No.: WO2019/238269
PCT Pub. Date: Dec. 19, 2019

(65) Prior Publication Data
US 2021/0254562 A1 Aug. 19, 2021

Related U.S. Application Data

(60) Provisional application No. 62/684,124, filed on Jun. 12, 2018.

(51) Int. Cl.
*F02D 13/02* (2006.01)
*F01L 13/06* (2006.01)
(Continued)

(52) U.S. Cl.
CPC .......... *F02D 13/0207* (2013.01); *F01L 1/267* (2013.01); *F01L 13/0005* (2013.01);
(Continued)

(58) Field of Classification Search
CPC ......... F01L 1/181; F01L 1/2411; F01L 1/267; F01L 2001/467; F01L 13/0005;
(Continued)

(56) References Cited

U.S. PATENT DOCUMENTS

2014/0251266 A1* 9/2014 Emmons ............... F01L 13/065
123/321
2019/0178113 A1 6/2019 McCarthy, Jr. et al.

FOREIGN PATENT DOCUMENTS

WO WO-2017/197044 A1 11/2017

OTHER PUBLICATIONS

International Search Report and Written Opinion for PCT/EP2019/025176 dated Sep. 23, 2019; pp. 1-8.

* cited by examiner

Primary Examiner — Jorge L Leon, Jr.
(74) Attorney, Agent, or Firm — Mei & Mark, LLP

(57) ABSTRACT

A method for engine braking on a type III valvetrain diesel engine comprises, on a first downstroke of a reciprocating piston, deactivating a normal intake lift profile on a first intake valve to implement a deactivated intake profile. Before a first upstroke of the reciprocating piston completes, a late intake valve closing lift profile is actuating on a second intake valve and beginning an engine brake lift profile on a first exhaust valve. On a second downstroke of the reciprocating piston, the engine brake lift profile on the first exhaust valve is completing and a normal exhaust lift profile is deactivating on a second exhaust valve to implement a deactivated exhaust profile on the second exhaust valve.
(Continued)

Before a second upstroke of the reciprocating piston completes, a second engine brake lift profile is beginning on the first exhaust valve.

15 Claims, 15 Drawing Sheets

(51) Int. Cl.
    *F02D 13/04*     (2006.01)
    *F01L 13/00*     (2006.01)
    *F01L 1/26*     (2006.01)
    *F01L 1/46*     (2006.01)
    *F01L 1/18*     (2006.01)
    *F01L 1/24*     (2006.01)

(52) U.S. Cl.
    CPC .............. *F01L 13/06* (2013.01); *F02D 13/04*
        (2013.01); *F01L 1/181* (2013.01); *F01L 1/2411*
                (2013.01); *F01L 2001/467* (2013.01)

(58) Field of Classification Search
    CPC ..... F01L 13/06; F01L 13/065; F01L 2201/00;
                      F02D 13/0207; F02D 13/04
    USPC ........................ 123/90.16, 90.4, 90.44, 198 F
    See application file for complete search history.

TWO STROKE ENGINE BRAKING VIA CYLINDER DEACTIVATION AND LATE INTAKE VALVE CLOSING

This is a § 371 US National Stage Application of Patent Cooperation Treaty Application No. PCT/EP2019/025176, filed Jun. 11, 2019, and claims the benefit of U.S. Provisional Application No. 62/684,124, filed Jun. 12, 2018, all of which are incorporated herein by reference.

FIELD

This application provides methods and devices for implementing two-stroke engine braking using a valvetrain configured for cylinder deactivation and late intake valve closing.

BACKGROUND

Variable valve actuation (VVA) on an engine valvetrain is desired so that the valvetrain can offer normal and specialized valve actuation techniques. A design problem persists to combine a two-stroke actuation technique with four-stroke actuation techniques on the same valves of the valvetrain.

SUMMARY

The methods disclosed herein overcome the above disadvantages and improves the art by way of methods and devices for provisioning variable valve actuation (VVA) comprising two-stroke techniques and four-stroke techniques on the same valve-set of the valvetrain. Instead of distributing VVA hardware sets for three actuation techniques across three cylinders and six valve pairings, the disclosure provides a valvetrain and actuation method for a single cylinder to comprise two-stroke braking on one of two exhaust valves, late intake valve closing on one of two intake valves, cylinder deactivation on all or some of the intake and exhaust valves, and normal lift on all of the intake and exhaust valves of the single cylinder. The disclosed valvetrain and actuation methods can be provisioned on all or some of the cylinders of the engine.

A method for engine braking on a type III valvetrain diesel engine comprises, on a first downstroke of a reciprocating piston, deactivating a normal intake lift profile on a first intake valve to implement a deactivated intake profile. Before a first upstroke of the reciprocating piston completes, a late intake valve closing lift profile is actuating on a second intake valve and beginning an engine brake lift profile on a first exhaust valve. On a second downstroke of the reciprocating piston, the engine brake lift profile on the first exhaust valve is completing and a normal exhaust lift profile is deactivating on a second exhaust valve to implement a deactivated exhaust profile on the second exhaust valve. Before a second upstroke of the reciprocating piston completes, a second engine brake lift profile is beginning on the first exhaust valve.

A type III valvetrain for a diesel engine can comprise a first intake valve configured to actuate a normal intake lift profile and a second intake valve configured to selectively actuate a late intake valve closing lift profile. An intake rocker arm comprising an intake-side lost motion spring can be configured to switch between implementing the normal intake lift profile and deactivating the normal lift profile via the intake-side lost motion spring to implement a deactivated intake profile. A first exhaust valve is connected to actuate a normal exhaust lift profile and a second exhaust valve is configured to selectively implement a normal exhaust lift profile on every other upstroke of a reciprocating piston or to selectively implement an engine brake lift profile on every upstroke of the reciprocating piston. An exhaust rocker arm comprises an exhaust-side lost motion spring and is configured to switch between implementing the normal exhaust lift profile and deactivating the normal exhaust lift profile via the exhaust-side lost motion spring to implement a deactivated exhaust profile.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures. While FIGS. 2-14 use a fairly consistent correlation of the piston travel to the crankshaft, the zero point of the crankshaft can be shifted such that the first top dead center location is not restricted to 60 degrees. Subsequent values of the piston location can be adjusted to align with the zero point of the crankshaft. Likewise, while the valve lift is shown on a scale having a zero to 15 lift height, the examples are consistent to provide a relative frame of reference and not to overly restrict the lift heights available when practicing the disclosure. Valve lifts are not restricted to only the heights and durations shown. Lift heights and durations can vary in practice in relation to the dimensions of the engine to which the valvetrain is applied.

Also, valve opening and closing can have a "tail." So, while it can be said that the intake valve begins opening "at" top dead center (TDC), there can be a "tail" where an amount of lift occurs that is less than full lift. The "tail" can occur to overcome inertia of the valve or its control hardware or to permit slow seating or unseating of the valve or its control hardware, among other reasons. So while the disclosure will say a valve motion occurs "at" top or bottom dead center, the intent is to encompass the "tail" portion while avoiding cumbersome jargon (around, about, near, at or near, substantially at, etc.) to encompass a slight valve motion occurring near TDC or BDC. There are also VVA techniques that affirmatively move the timing of the valve opening or closing more than a "tail" amount, as for affirmative changes in fluid flow (swirl, scavenging, wetting, or tailored access to the fluid in the corresponding manifold, etc.). These techniques are not excluded by use of "at" TDC or BDC.

Figure 4:
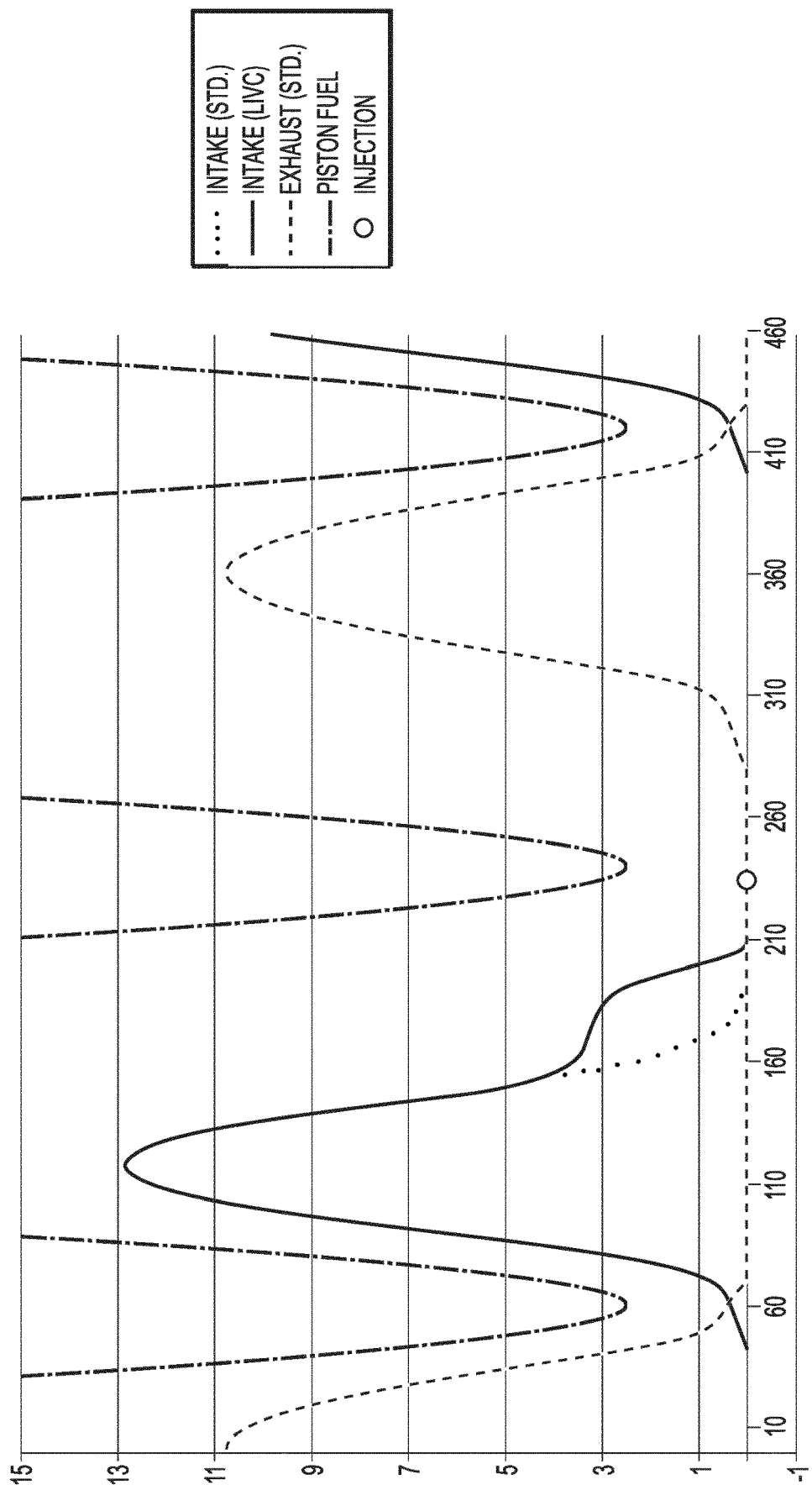
Figure 5:
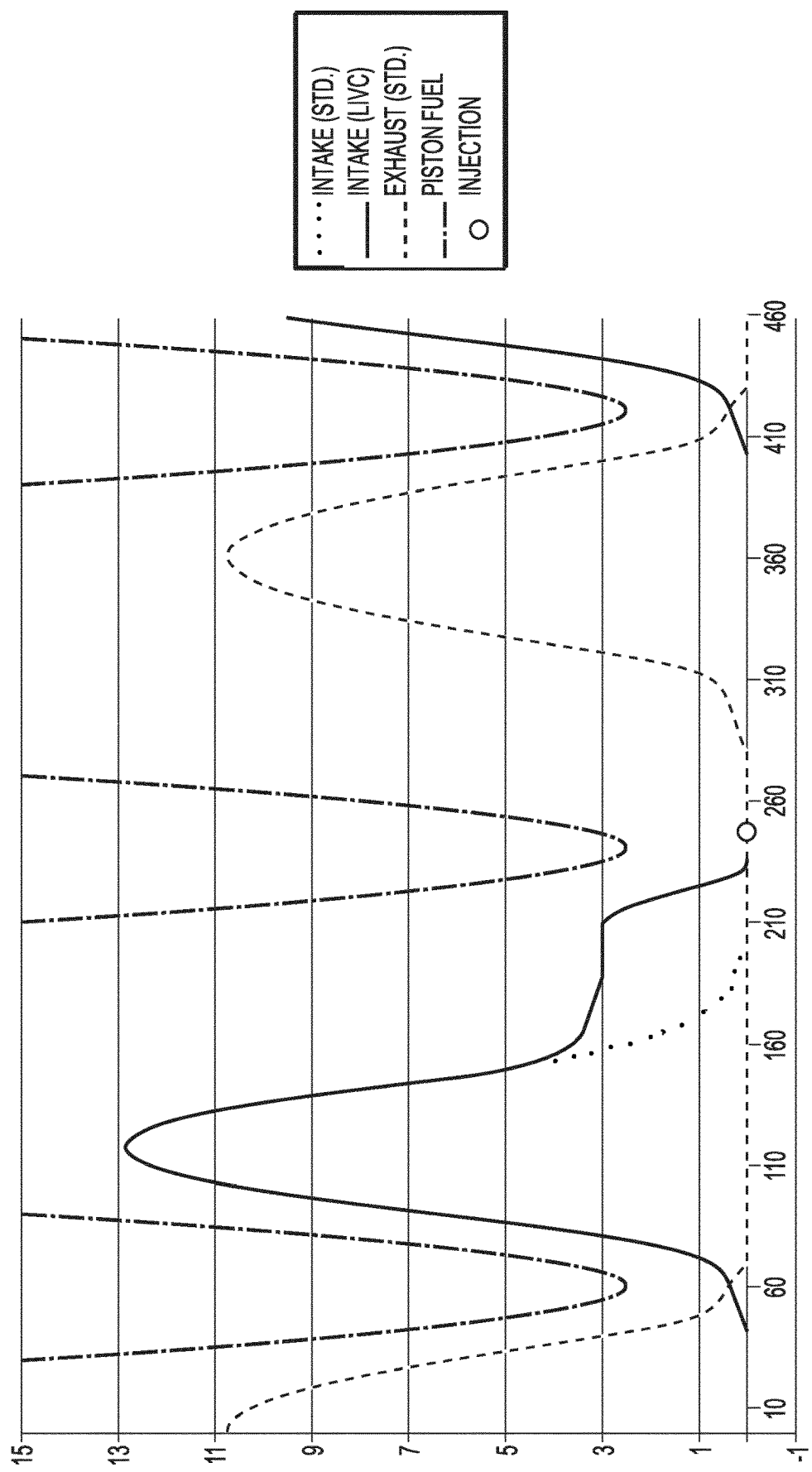
Figure 6:
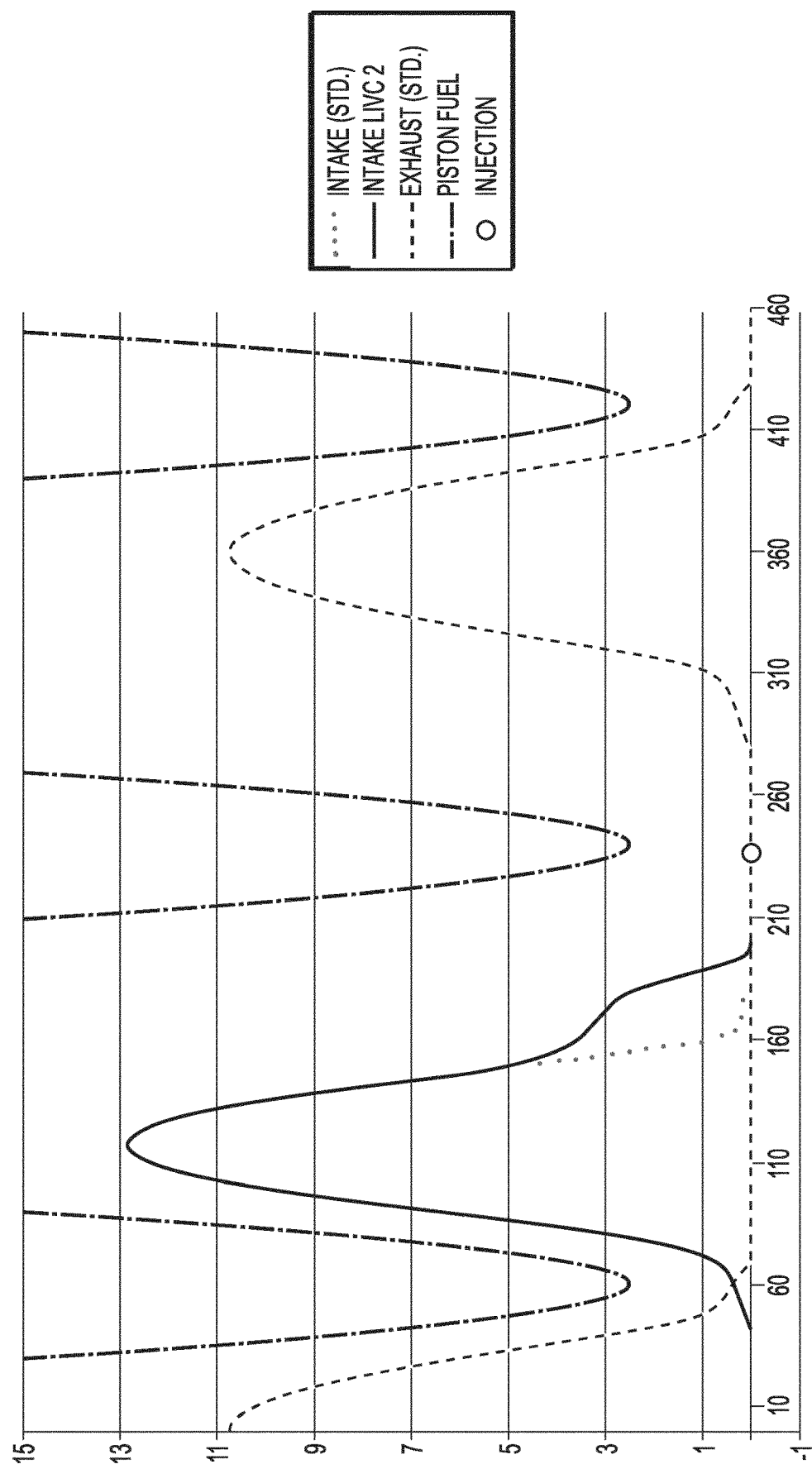

Using cylinder deactivation (CDA) hardware connected to valves of a cylinder enables new braking techniques. A two-stroke engine braking technique can be implemented as seen in FIGS. 8-12 & 14 as by utilizing a braking capsule and control hardware. By also using Late intake valve closing (LIVC) hardware, varying LIVC lift profiles can be implemented, as seen in FIGS. 4-6. When combined with CDA hardware, the LIVC hardware enables Intake Re-Charge for Braking (IRC). This refills the cylinder with charge air from the intake manifold resulting in higher brake power output. Such can be seen in FIGS. 11-12 & 14.

Figure 2:
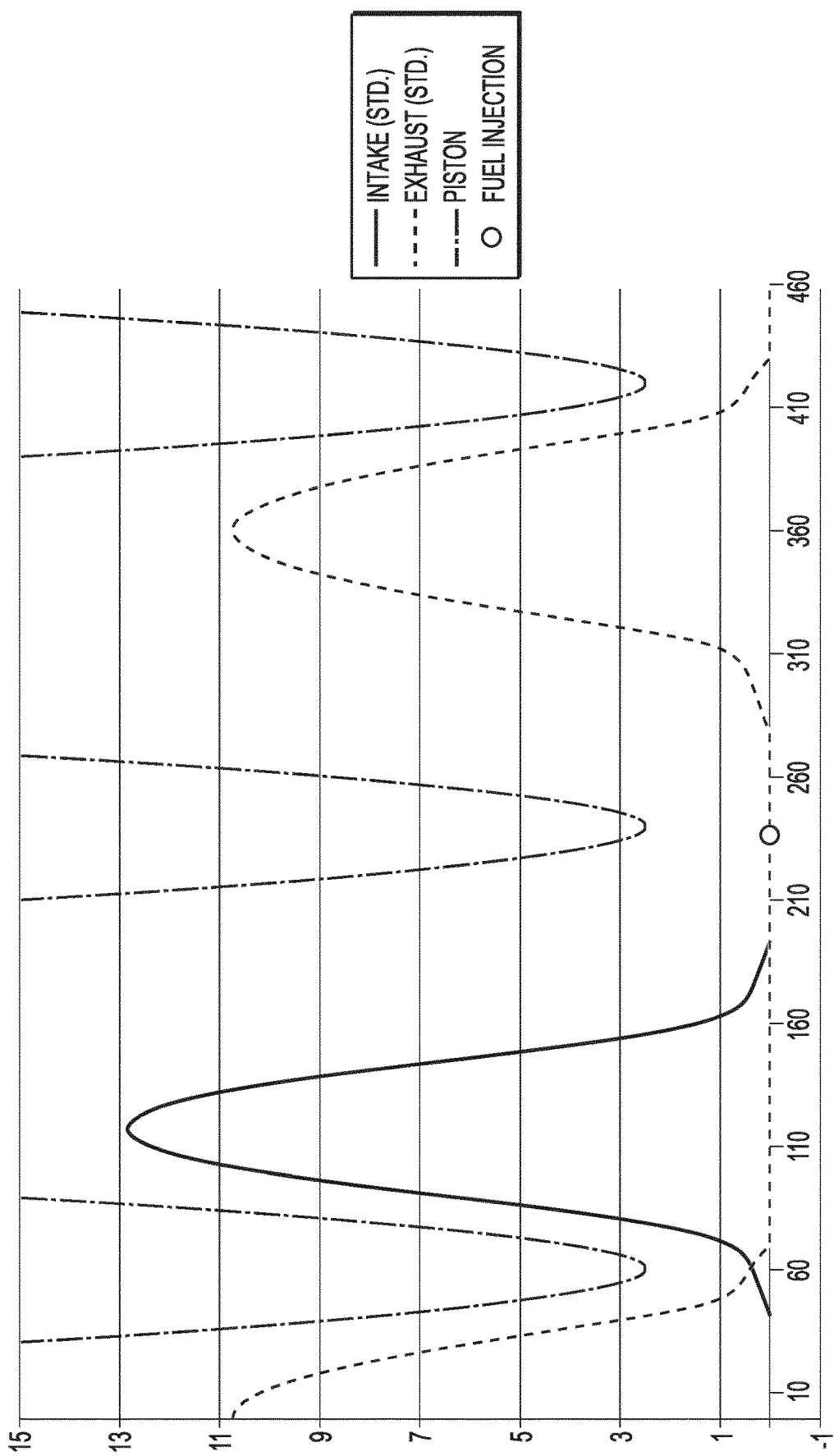
FIGS. 2-14 illustrate valve lift profiles compatible with the valvetrain.

FIG. 2 shows a normal intake lift profile and a normal exhaust lift profile for pairs of intake and exhaust valves on a cylinder. Normal is sometimes indicated as STD or standard in the Figures. A piston is shown to reciprocate. The piston travels in the cylinder from bottom dead center (BDC) to top dead center (TDC) as the crankshaft of the engine rotates. FIG. 2 shows the piston at TDC at 60, 240, & 420 degrees of crankshaft rotation. At 90 degree intervals, 150 & 330 degrees of crankshaft rotation, the piston is at BDC. The piston motion in the figures is truncated some and bottom dead center is omitted to permit a closer look at the valve actuation.

In a normal, or nominal, 4-stroke engine cycle, the two intake valves open as the piston travels from TDC to BDC (intake stroke, stroke 1) to draw fluid such as air or air mixed with EGR gas into the cylinder. The two intake valves close at bottom dead center. The fluid is compressed as the piston travels from BDC to TDC (compression stroke, stroke 2). A fuel injection occurs as the piston is reaching this second TDC. Fuel injection is not limited and can comprise multiple injections, delayed or advanced injection, cylinder wetting, among other techniques. Being a diesel engine system, the force of compression in the cylinder can ignite the fuel and transfer force to the piston as the piston travels from BDC to TDC (power stroke, stroke 3). The exhaust valves can begin opening at this second BDC, and can open and close as the piston travels the second time from BDC to TDC (exhaust stroke, stroke 4).

As discussed in more detail below, numerous alternatives can be had, but duplicating one of the layouts of FIGS. 1A & 1B so that intake valves on a first side of a cylinder and exhaust valves on another side of the cylinder have one of the variable valvetrains shown suffices for operation. Normal operation can be accomplished as by actuating the rocker arm 300 with the lost motion spring 321 locked against motion via latch 324 and pressing foot 401 against valve bridge 410 so that it equally actuates valves V1 & V2.

Figure 3:
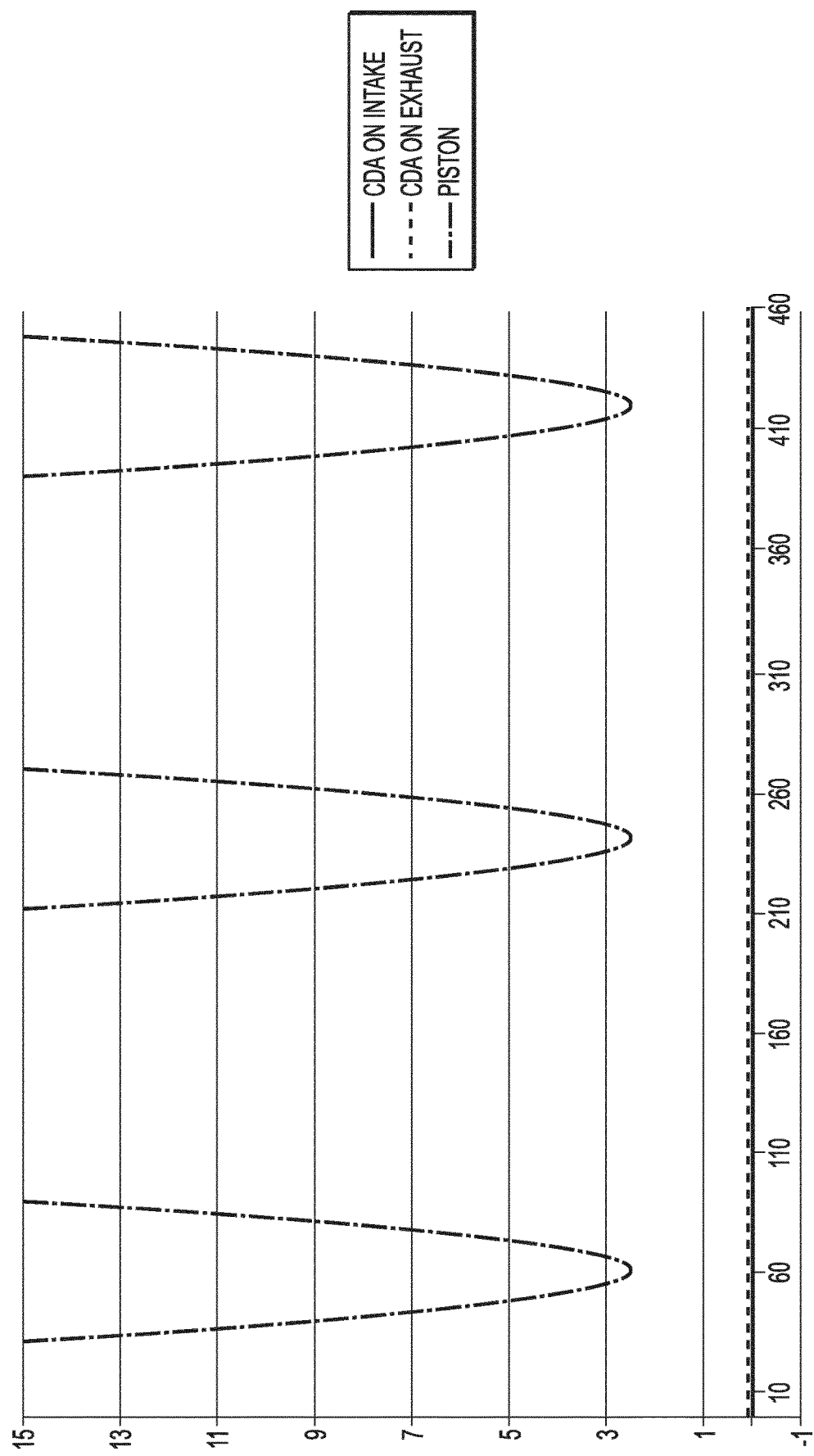

FIG. 3 shows cylinder deactivation on both pairs of intake and exhaust valves. The piston reciprocates, the intake and exhaust valves do not open or close. Such deactivated profile can be had by supplying pressurized oil to latches 324 to collapse latch spring 325 so that leg 326 can slide in body 323 and cup 322 can collapse lost-motion spring 321 in cylinder 302 of CDA capsule 320. When cam 306 actuates on roller 305 on roller shaft 304, the rocker arm 300 pivots body 301 about rocker shaft 303. But, the lost-motion spring collapses and the rocker arm does not force valve motion via valve bridge 410.

In FIGS. 4-6, various late intake valve closing (LIVC) lift profiles are shown. Regular exhaust valve motion is actuated on both exhaust valves. A standard profile is shown, but nothing precludes a VVA technique such as an early or late opening or closing event on the exhaust valve. When used as an intake valvetrain, first valve V1 is linked to the valve bridge 410 so that normal intake valve lift is applied to the first intake valve. The second intake valve applies the nominal (FIG. 4), long (FIG. 5), or short (FIG. 6) LIVC lift profile by applying hydraulic pressure to cylinder 422 to extend piston 403 out of intake-side capsule 420. Piston 403 includes a valve seat or cleat or other attachment to actuate against second valve V2 at its stem end. Control signal on line 220 controls the duration of the LIVC event so that the second intake valve remains open past the first intake valve.

Figure 7:
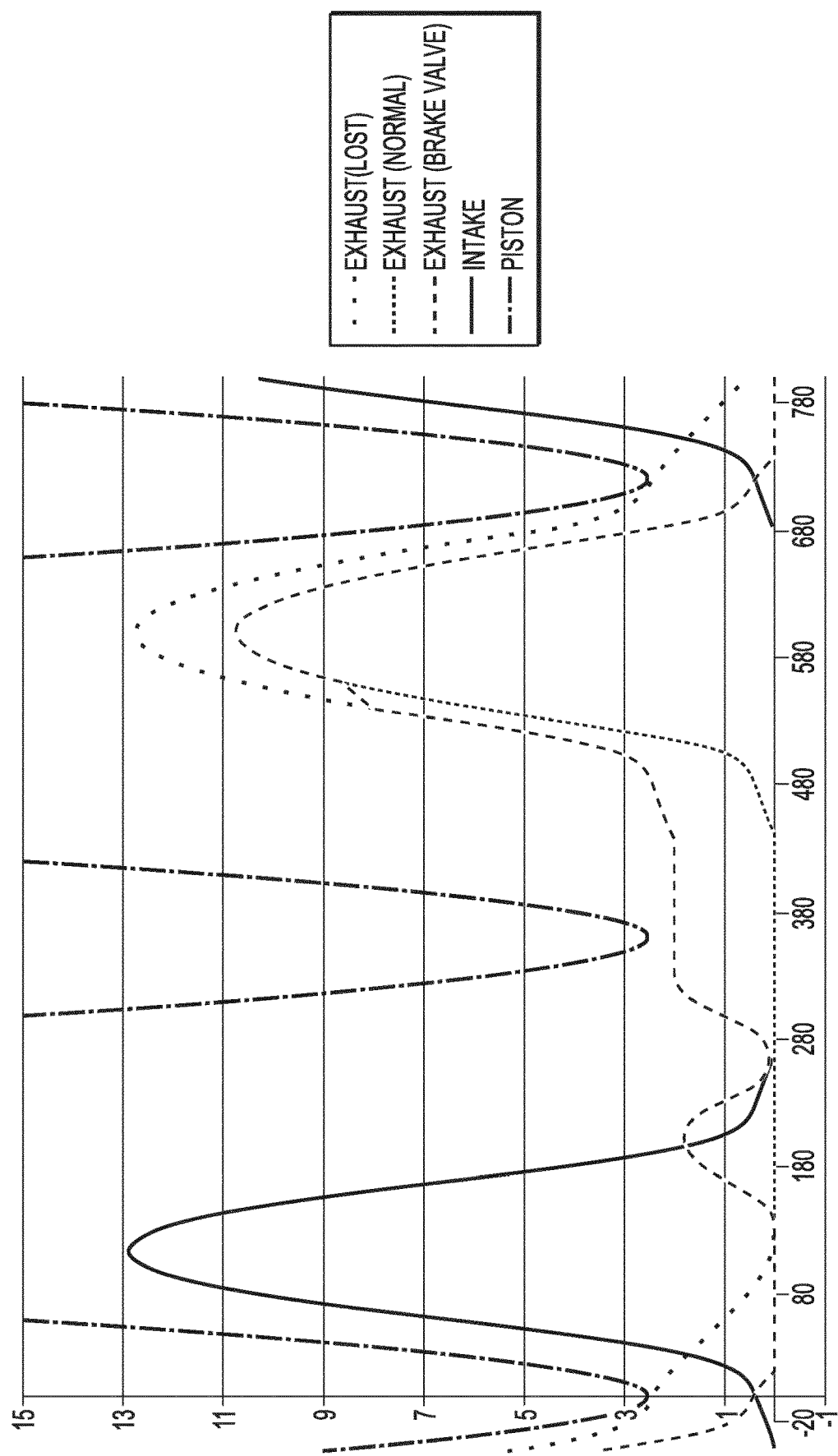

In FIG. 7, a specialized 4-stroke braking technique is shown. The intake valves can lift and lower according to the normal intake lift profile. No fuel injection is supplied. With one of the valvetrains of FIG. 1A or 1B applied to the exhaust side of the cylinder, multiple braking events can occur resulting in "boosting" the charge in the cylinder and increasing the braking power. The first brake gas recirculation event can be had around the end of the intake valve closing, about 130-270 degrees of crankshaft rotation, by actuating the exhaust-side capsule a first time. Some compression of the cylinder is permitted as the piston rises towards TDC, but the exhaust-side capsule is actuated again, and the BRAKE VALVE profile is applied to the valvetrain to brake the engine in a compression release manner. If the exhaust side capsule is actuated for the whole cycle, piston contact could occur, as shown in the LOST line. So, the exhaust side capsule is deactivated for the valve lift profile to return to the normal exhaust valve lift profile. The valve bridge 410 acted on by the rocker arm 300 can supply the normal exhaust valve lift profile, while special control of the exhaust side capsule can supply the special engine brake profiles. The exhaust side capsule control can be according to FIG. 1A or 1B.

Figure 8:
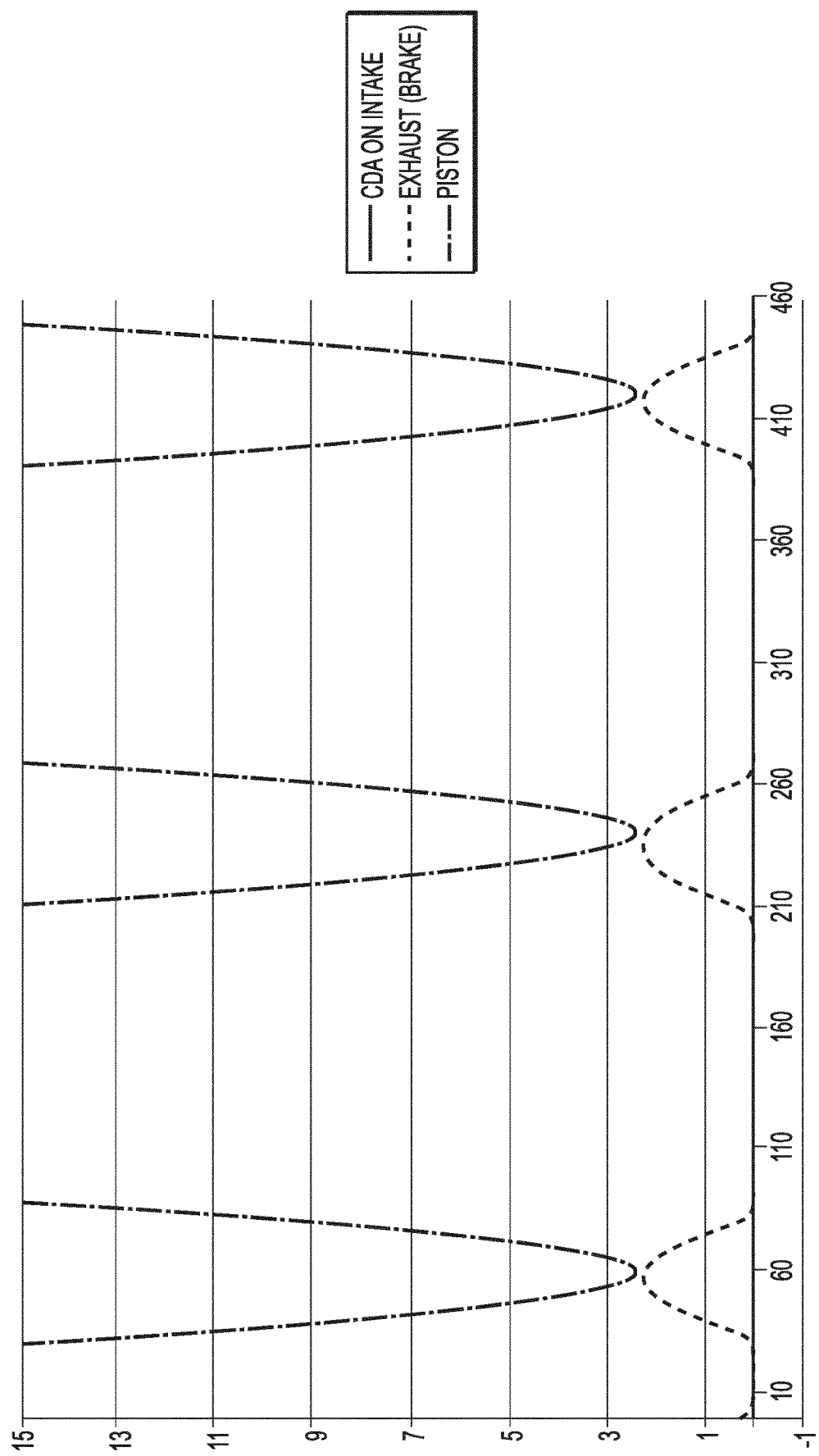

The valvetrains herein also permit a two-stroke engine braking with cylinder breathing from the exhaust. There is nearly net zero flow through the aftertreatment system, which allows the aftertreatment to remain hot and ready to filter pollution. FIG. 8 shows a two-stroke braking technique where an engine braking command at control actuators 2000 of the type III diesel engine valvetrain results in implementing an engine brake lift profile on the second exhaust valve on every upstroke of the reciprocating piston until a normal operation command is received at the control actuators. By compressing the latches 324 to permit lost motion of lost motion spring 321, the normal valve lift profile is discontinued on the intake and exhaust valves. But, controlling the capsule 420 on the valve bridge 410 can lift and lower the second valve V2 according to the control signal.

The two stroke braking is itself desired. However, the embodiment of FIG. 8 has lower braking power than if Intake Re-Charge (IRC) were to be implemented. IRC, shown in FIGS. 9-12 & 14, refills the cylinder with charge air from the intake resulting in higher brake power output. This braking technique also eliminates the normal intake lift profile and normal exhaust lift profile via the cylinder deactivation hardware. The IRC profile, also called a late intake valve lift profile, is provided using the LIVC hardware, namely the intake-side capsule. So, the LIVC hardware enables dual functions of main lift intake opening followed by Late Intake Valve Closing and an alternative function of IRC. The valvetrain can provide, with the same hardware, main (normal), LIVC and IRC valve lift profiles on the same set of intake valves. So, even with the rocker arm motion in lost motion, and the valve bridge 410 not actuating, the intake-side capsule can be controlled by control hardware such as hydraulic controller 2000. The valve can be lifted and lowered by the piston 403 and cylinder 422 combination. And, FIG. 1B enables additional valve lift control by a second rocker arm 332.

Figure 9:
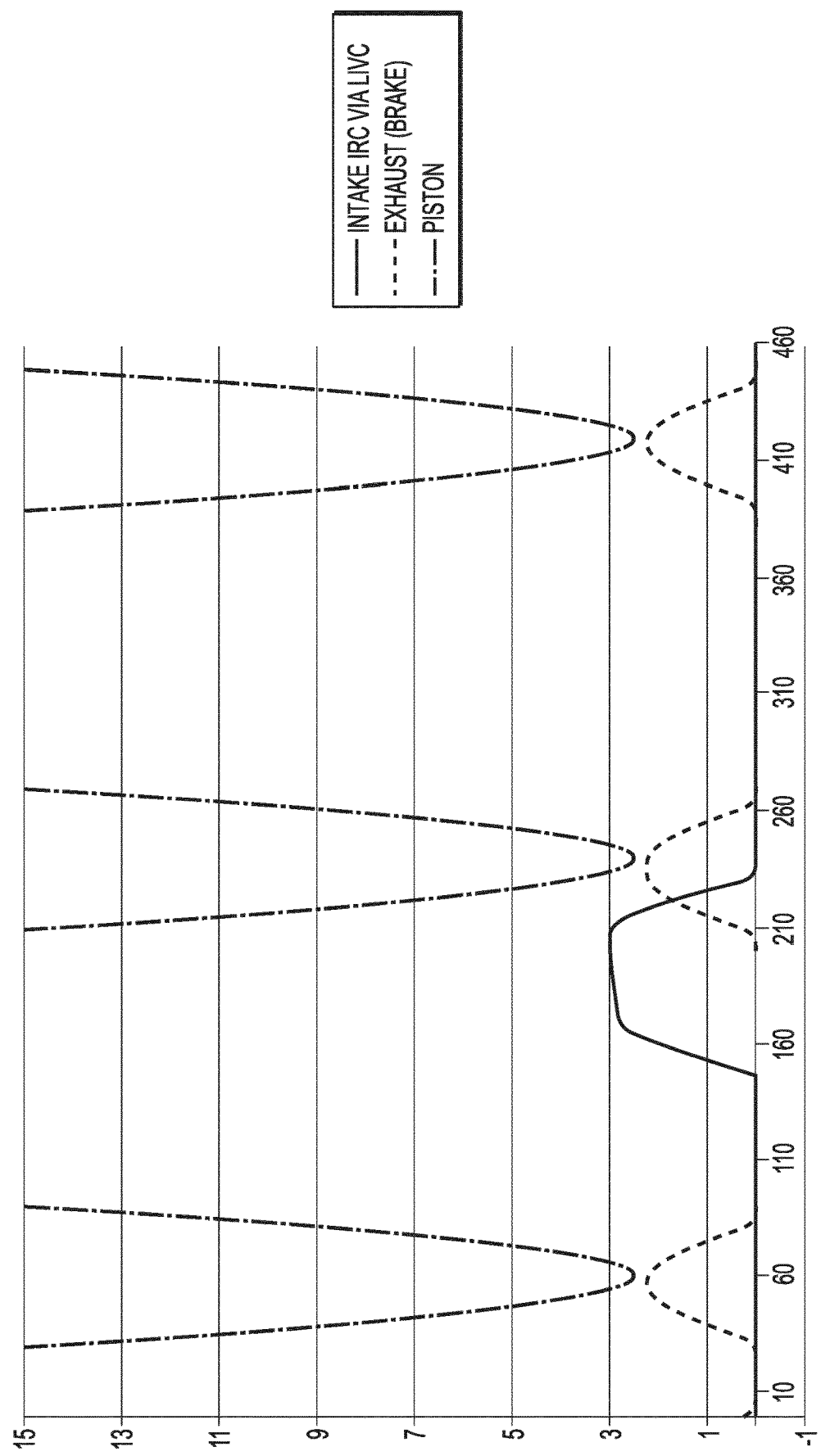
Figure 10:
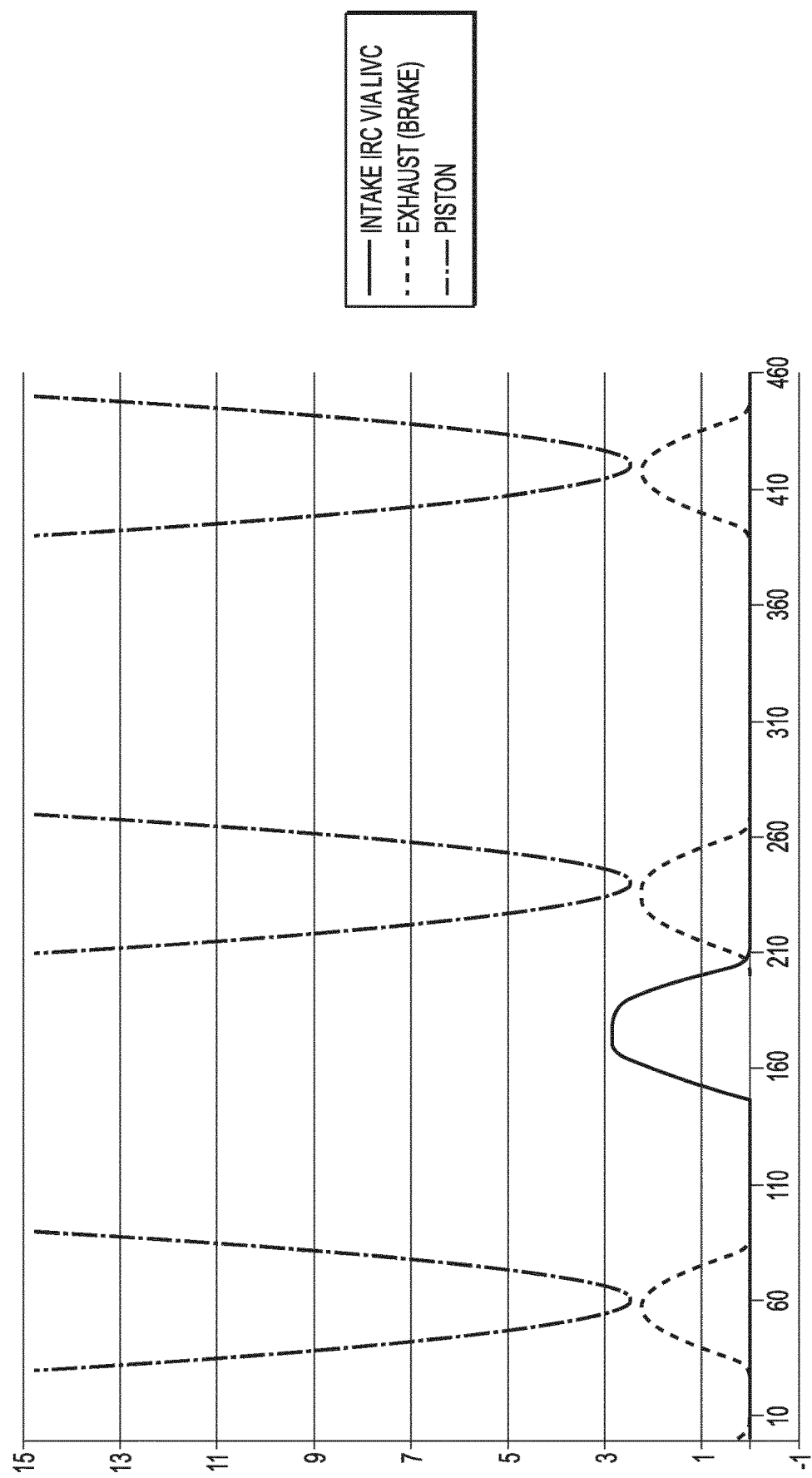
Figure 11:
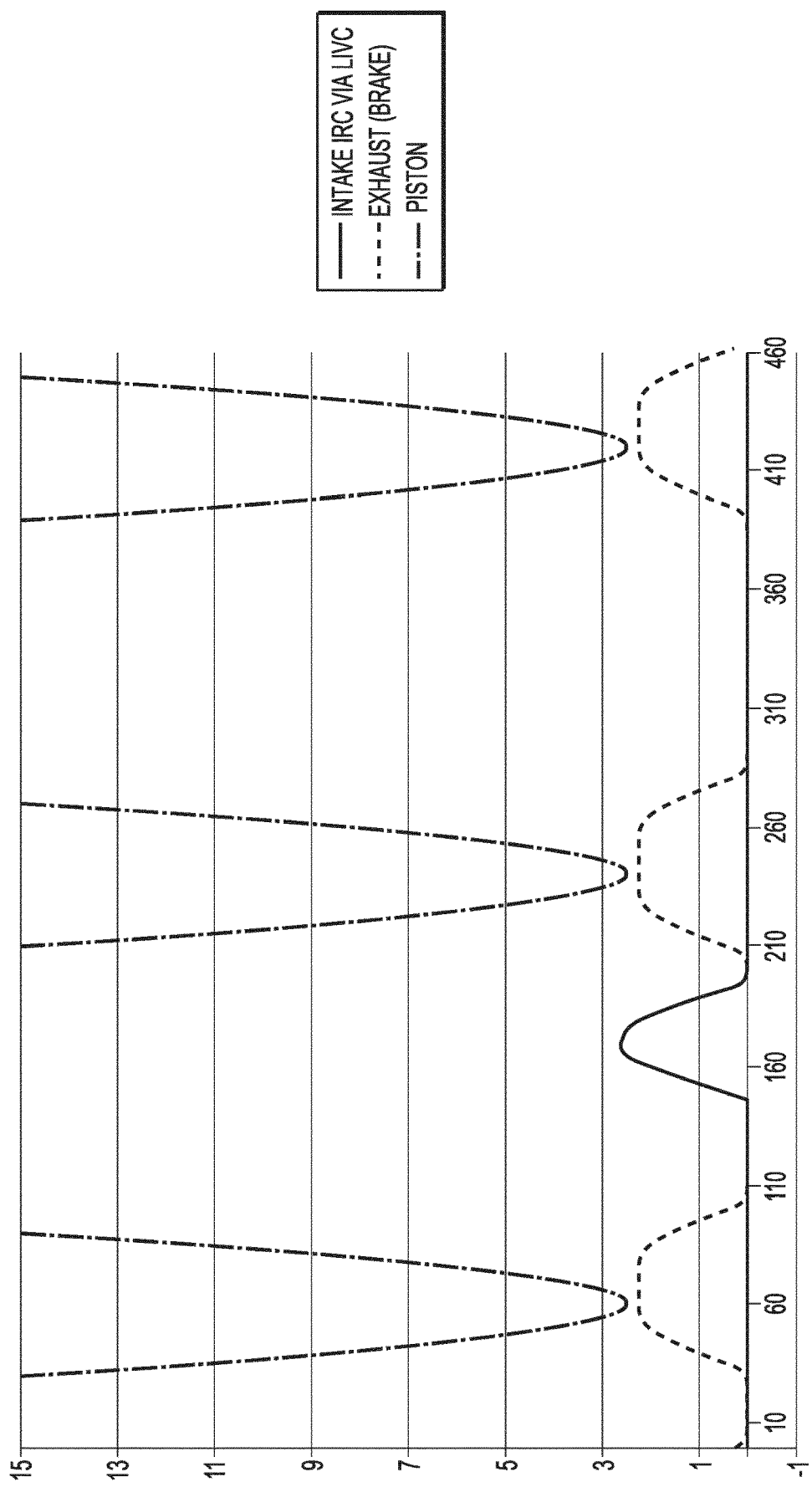
Figure 12:
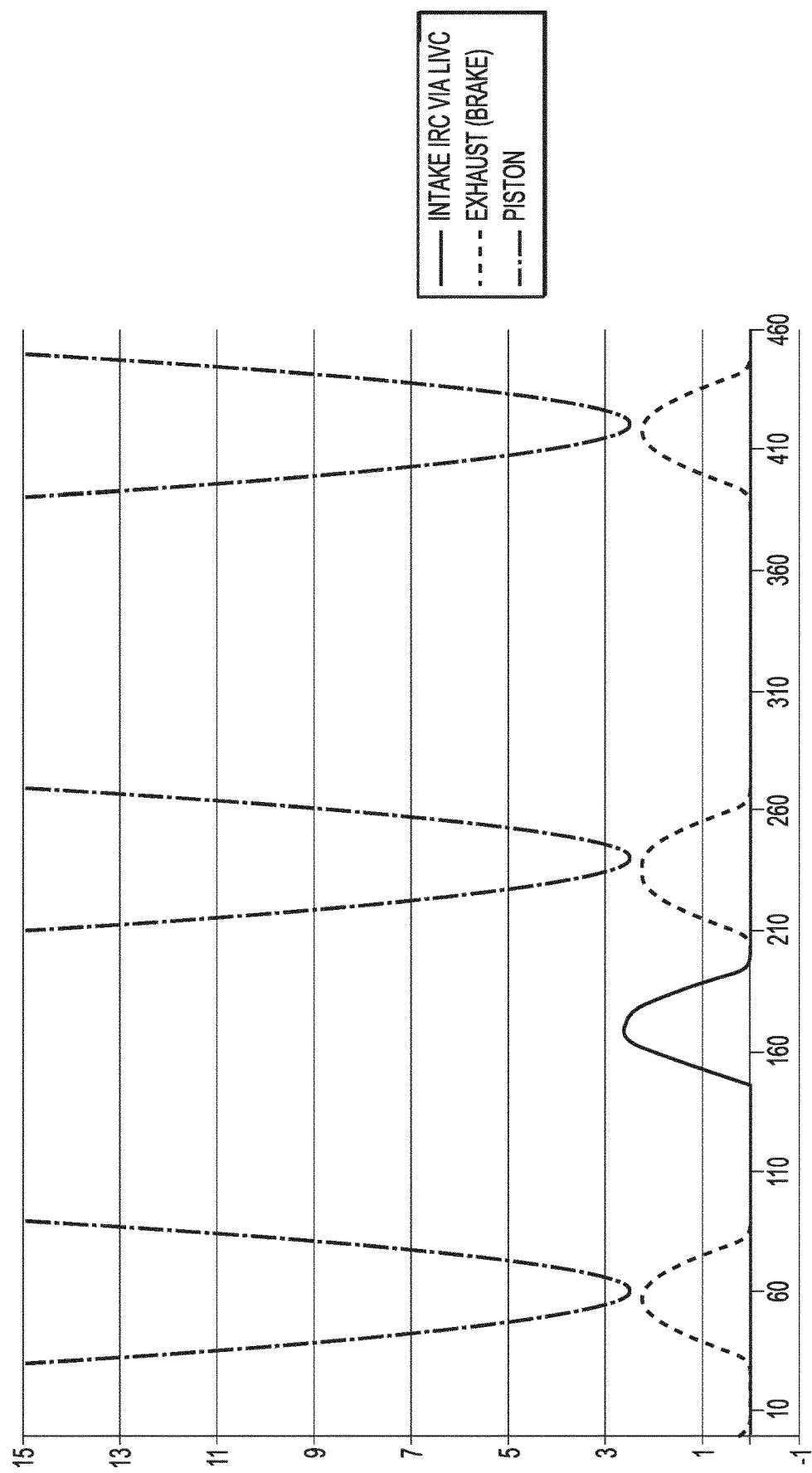

FIG. 9 shows and extended IRC lift profile and nominal exhaust brake profiles at TDC. FIG. 10 shows a nominal IRC lift profile and nominal exhaust brake profiles. FIG. 11 shows a short IRC lift profile and extended exhaust brake profiles. FIG. 12 shows a short IRC lift profile and nominal exhaust brake profiles.

The configurations permit engine braking at TDC each time the piston comes to TDC. Fresh air (charge air or exhaust gas recirculation (EGR) or mixtures thereof) is brought in thru the LIVC lift profile. The normal LIVC lift profile can be applied to maintain intake valve lift for extended closing of the intake valve.

Hardware combinations can utilize CDA deactivating hardware to eliminate normal intake lift. LIVC lift profile can be actuated on one intake valve just for the LIVC portion to bring in fresh air. The intake side capsule can be configured to apply normal lift profiles to both valves, and then the intake side capsule can be activated to only the second intake valve to apply the LIVC profile and the first intake valve can open and close normally. The capsule control so configured, then the "boot" portion can be applied without the normal valve lift profile like done in FIGS. 9-12.

Figure 13:
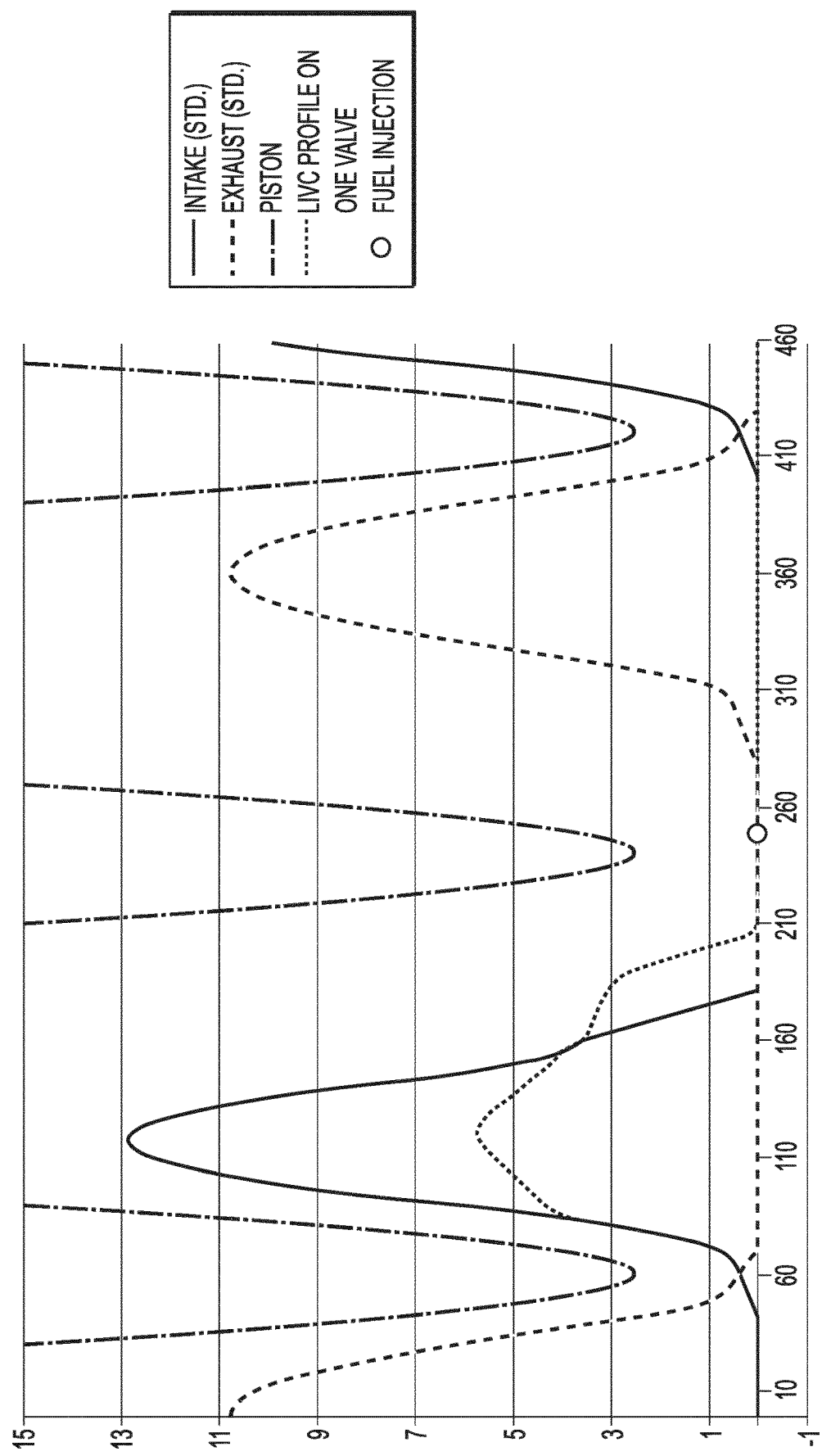
Figure 14:
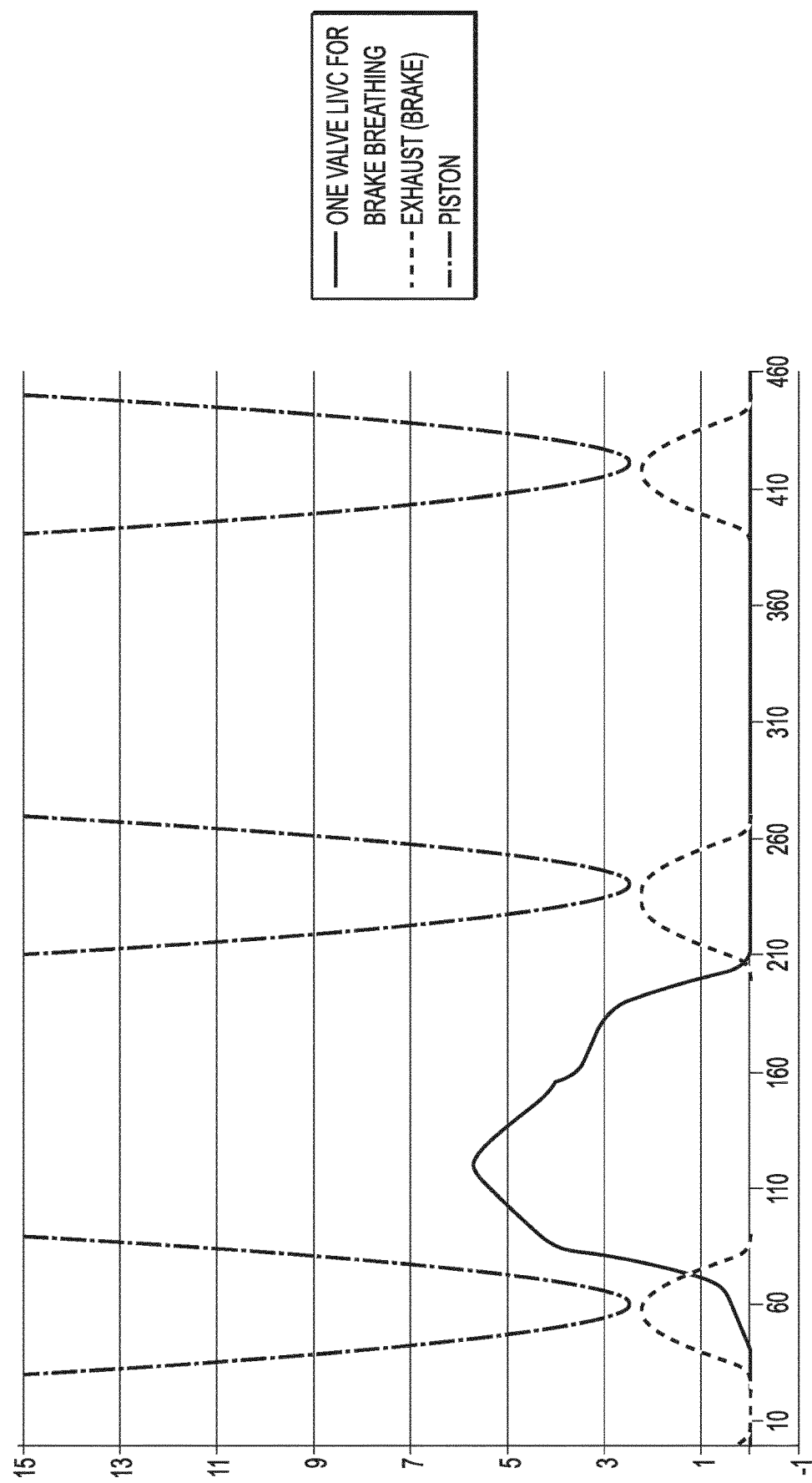

Or, as shown in the alternative normal mode of FIG. 13, one intake valve can actuate in the normal lift profile. Then, the second intake valve can actuate with a modified LIVC lift profile. A cam profile on cam 306 and a separate cam profile on cam 361 for rocker arm 301 and rocker arm 332 can be suitable for this configuration. The exhaust valves can lift and lower via the bridge according to the normal exhaust lift profile. Then, in the two-stroke braking with IRC of FIG. 14, the one intake valve is deactivated with its rocker arm in lost motion, the modified LIVC lift profile persists and now provides intake recharge (IRC). The normal exhaust lift is deactivated, and the exhaust side capsules are controlled to provide two-stroke braking.

In the disclosure, the same cylinder can switch among two stroke and four stroke engine braking, LIVC, normal valve lift, and cylinder deactivation (CDA) techniques. The, CDA hardware enables an easier way for 2-Stroke engine braking. The intake-side and exhaust-side capsule can be off while CDA mode (FIG. 3) is implemented. And, LIVC lift profile can supply IRC (Intake Recharge) for the braking techniques. The LIVC and engine braking hardware (capsules) can be applied one per respective intake valve and exhaust valve per cylinder. A positive flow thru the aftertreatment system can be enabled.

Many aspects of the valvetrain have been described above, but returning to FIGS. 1A & 1B, additional aspects will be described.

Figure 1A:
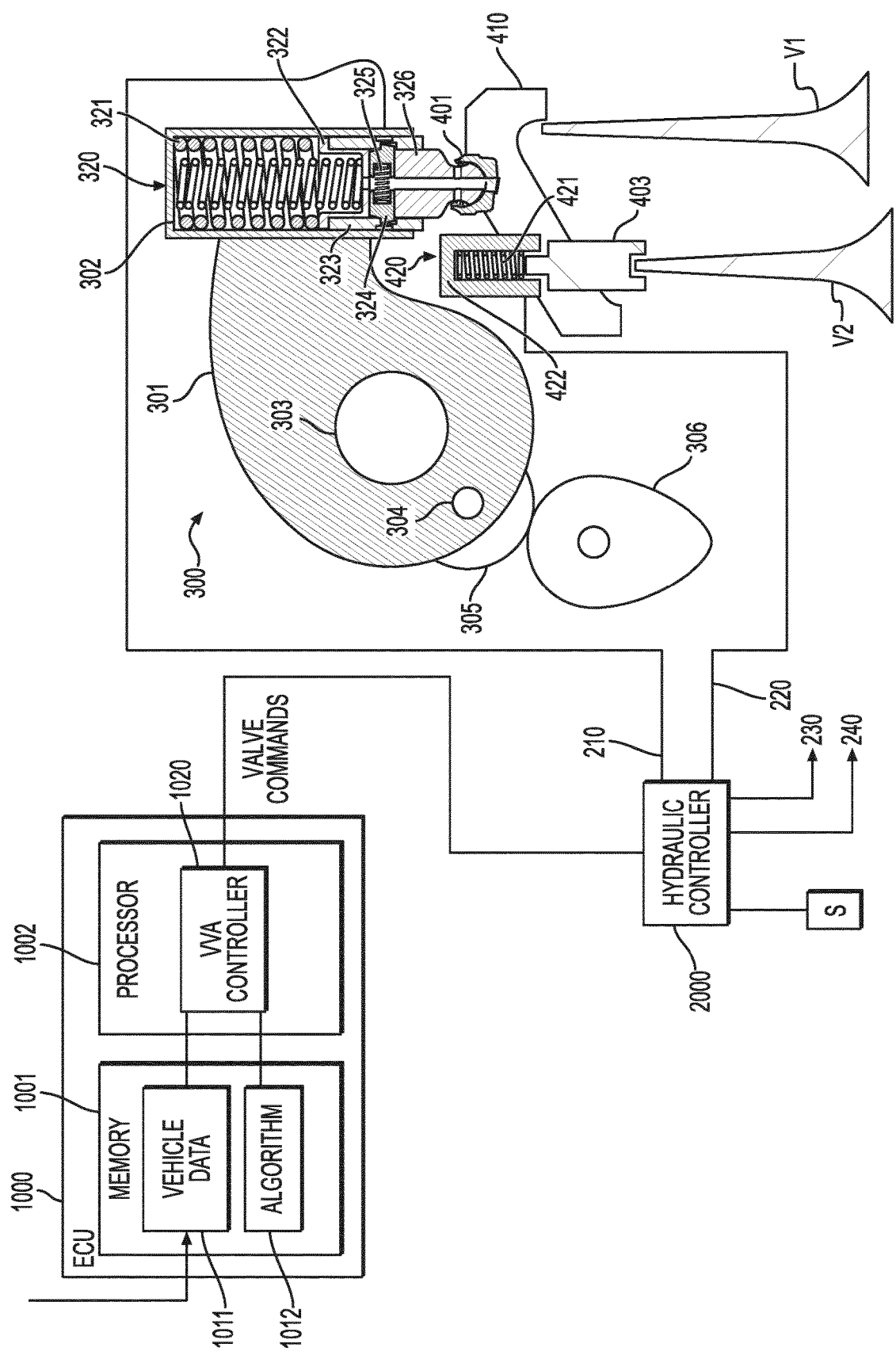
FIGS. 1A and 1B provide schematics for one half of a valvetrain.

FIG. 1A provides schematic control hardware for implementing the VVA techniques described herein. An electronic control unit 1000 comprises a memory 1001 and processor 1002. Vehicle data can be collected and stored in a vehicle data section 1011 of the memory 1001. Vehicle data can comprise load data, speed data, failsafe data, crankshaft data, pedal position, user inputs, among other data used by VVA controller 1020 when deciding whether to implement cylinder deactivation mode, LIVC mode, two-stroke braking mode, four-stroke braking mode, IRC mode, and normal mode with the various corresponding lift profiles. Control programming can comprise computer algorithms stored in the algorithm section 1012 of the memory, such can be accessed and implemented by the processor 1002. VVA controller 1020 can process algorithms configured to implement the methods disclosed herein and output valve commands to a hardware controller.

Hardware controller is shown as a hydraulic controller 2000, but hardware controller can take the form of electric, mechanical, pneumatic and other devices so long as the disclosed lift profiles can be implemented. As drawn, the hydraulic controller can comprise oil control valves, solenoids or spools as needed to control the valvetrain. A CDA control line 210 can route to the latches 324 of the CDA capsule 320 to lock and unlock the lost motion spring 321. CDA capsule 320 is shown in the valve side 302 of the rocker arm 300. Alternatively, a lost-motion spring can be connected in the body 301 of the rocker arm in a "scissor" configuration having cam side arm and a valve side arm, among numerous alternatives for locating a CDA capsule. A CDA capsule can even be centered over the valve bridge 410. A capsule control line 220 can route to the capsule 420 on the valve bridge designed for the LIVC or engine braking modes. A second set of control lines 230, 240 are included because the rocker arm can be duplicated for the intake and exhaust sides of the cylinder and the drawings are not obfuscated by the duplication. A sump S can be connected to the hydraulic controller 2000.

Figure 1B:
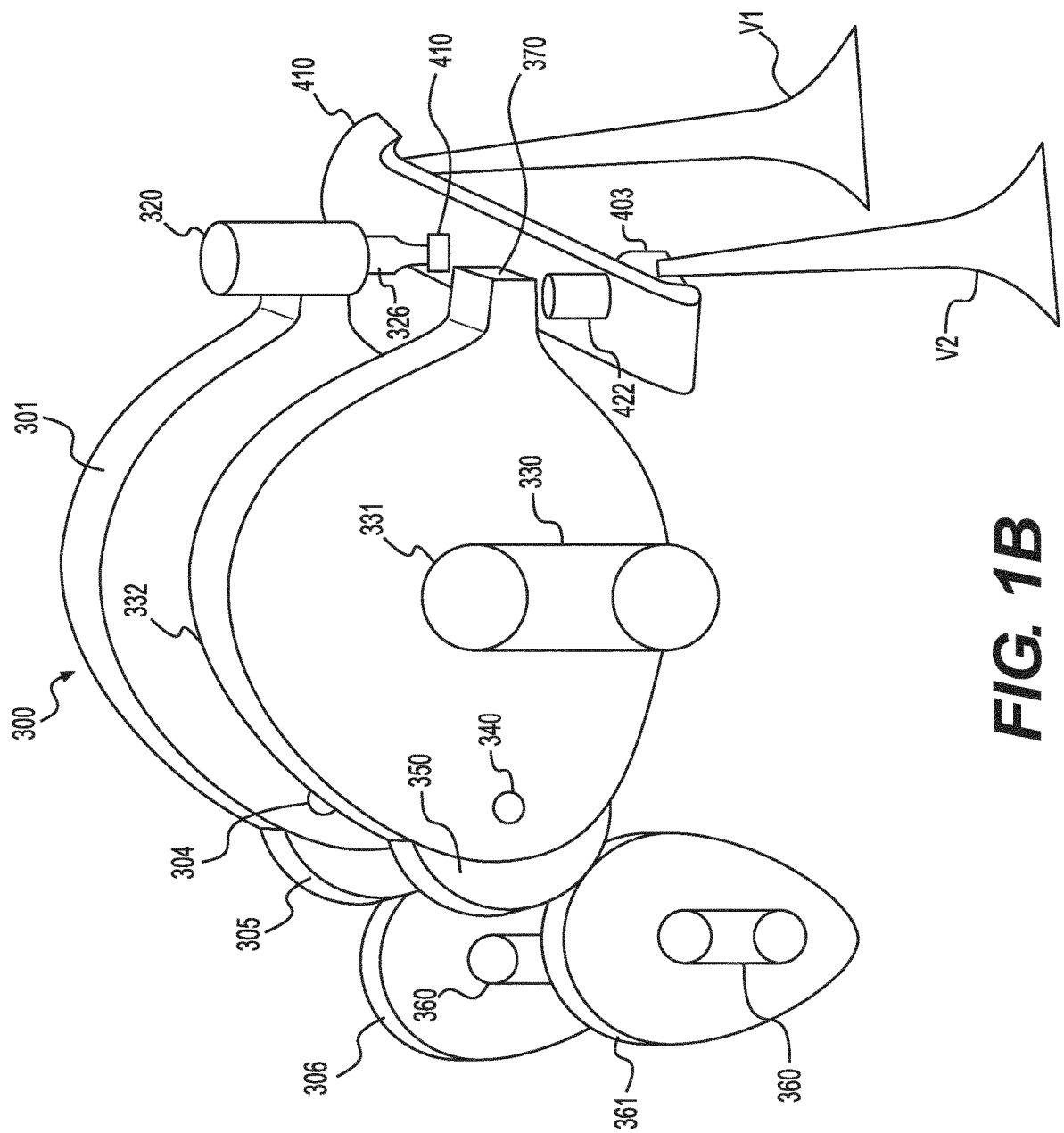

An alternative valvetrain is shown in FIG. 1B. Two rocker arms are provided. When the capsule 420 can additional cam actuation applied to it, a second rocker arm 332 is provided. The second rocker arm can pivot about rocker shaft 330 via body 331. Valve end 370 can press on the capsule 420. If there is no control signal applied to the capsule 420, it is possible that capsule spring 421 can be spongy and have lost motion. With a control signal applied, the capsule 422 and piston 403 combination can be rigid and a cam lobe profile can transfer from cam lobe 361 on rotating cam shaft 360 to roller 350 on roller mount 340 to rotate rocker arm 332 and valve end 370 with the transferred cam lobe profile.

With these layouts in mind, a type III valvetrain for a diesel engine can comprise a first intake valve V1 configured to actuate a normal intake lift profile and a second intake valve V2 configured to selectively actuate a late intake valve closing lift profile. An intake rocker arm 300 comprising an intake-side lost motion spring 321 can be configured to switch between implementing the normal intake lift profile and deactivating the normal lift profile via the intake-side lost motion spring to implement a deactivated intake profile. In duplication of parts, a first exhaust valve is connected to actuate a normal exhaust lift profile and a second exhaust valve is configured to selectively implement a normal exhaust lift profile on every other upstroke of a reciprocating piston or to selectively implement an engine brake lift profile on every upstroke of the reciprocating piston. An exhaust rocker arm comprises an exhaust-side lost motion spring and is configured to switch between implementing the normal exhaust lift profile and deactivating the normal exhaust lift profile via the exhaust-side lost motion spring to implement a deactivated exhaust profile.

An intake valve bridge 410 can be connected to the first intake valve and to the second intake valve to actuate the normal intake lift profile via the intake valve bridge. An intake-side capsule can be additionally configured to selectively actuate a late intake valve closing lift profile via the intake-side capsule. The LIVC can be actuated by the intake-side capsule alone, or a second intake rocker arm can be included to actuate the intake-side capsule.

In a simplified valvetrain, the LIVC aspect is omitted to facilitate 2-stroke engine braking, only. In a complex valvetrain, the LIVC aspect is controlled to provide IRC with the 2-stroke braking. The valvetrain comprises an exhaust valve bridge, the first exhaust valve and the second exhaust valve connected to actuate a normal exhaust lift profile via the exhaust valve bridge. An exhaust-side capsule is configured to selectively actuate the engine brake lift profile on the second exhaust valve. The exhaust braking (engine braking) can be actuated by the exhaust-side capsule alone (FIG. 1A) or a second exhaust rocker arm (FIG. 1B) can be included.

A method for engine braking on a type III valvetrain diesel engine comprises, on a first downstroke of a reciprocating piston, deactivating a normal intake lift profile on a first intake valve to implement a deactivated intake profile. Before a first upstroke of the reciprocating piston completes, a late intake valve closing lift profile is actuating on a second intake valve and beginning an engine brake lift profile on a first exhaust valve. On a second downstroke of the reciprocating piston, the engine brake lift profile on the first exhaust valve is completing and a normal exhaust lift profile is deactivating on a second exhaust valve to implement a deactivated exhaust profile on the second exhaust valve. Before a second upstroke of the reciprocating piston completes, a second engine brake lift profile is beginning on the first exhaust valve.

An engine braking command can be received at control actuators (hydraulic controller 2000) of the type III diesel engine valvetrain. Implementing an engine brake lift profile on the first exhaust valve on every upstroke of the reciprocating piston can be controlled until a normal operation command is received at the control actuators. In alternatives: The engine brake lift profile can be implemented with or without an intake recharge (IRC) command to implement a late intake valve closing profile on the second intake valve, the IRC command implemented on every other upstroke of the piston; The engine brake lift profile can be implemented with or without deactivation of the normal exhaust lift profile; and The engine brake lift profile can be implemented with or without deactivation of the normal intake lift profile.

When the normal operation command is received after one or more of an LIVC mode command, a CDA mode command, or an engine braking mode command at the control actuators, the engine brake lift profile is switched off of the first exhaust valve. The normal exhaust lift profile is switched on for both the first exhaust valve and the second exhaust valve so that the first exhaust valve and the second exhaust valve open and close for every other downstroke and upstroke reciprocation of the reciprocating piston. The normal intake lift profile is switched on for the first intake valve. The late intake valve closing lift profile is actuated on the second intake valve so that the first intake valve and the second intake valve open and close on downstrokes and upstrokes between the every other downstroke and upstroke reciprocation of the reciprocating piston.

When the normal operation command is received at the control actuators the engine brake lift profile is switched off of the first exhaust valve. And, the normal exhaust lift profile is switched on for both the first exhaust valve and the second exhaust valve so that the first exhaust valve and the second exhaust valve open and close for every other downstroke and upstroke reciprocation of the reciprocating piston. The late intake valve closing profile is switched off of the second intake valve. The normal intake lift profile is switched on for the first intake valve and for the second intake valve so that the first intake valve and the second intake valve open and close without the late intake valve closing lift profile on downstrokes and upstrokes between the every other downstroke and upstroke reciprocation of the reciprocating piston.

A late intake valve closing command can be received at control actuators of the type III diesel engine valvetrain. An intake recharge profile can be implemented on the second intake valve on every other upstroke of the reciprocating piston until a normal operation command is received at the control actuators.

An intake-side lost motion spring can be actuated on an intake rocker arm to deactivate the normal intake lift profile on the first intake valve. An exhaust-side lost motion spring can be actuated on an exhaust rocker arm to deactivate the normal exhaust lift profile.

An exhaust-side capsule can be actuated to begin the engine brake lift profile. Additionally, a second exhaust rocker arm can be actuated to actuate the exhaust-side capsule.

The late intake valve closing lift profile can be actuated on the second intake valve beginning on the first downstroke of the reciprocating piston. With control commands from the control hardware, the late intake valve closing lift profile on the second intake valve can also begin on the first upstroke of the reciprocating piston.

Other implementations will be apparent to those skilled in the art from consideration of the specification and practice of the examples disclosed herein.

What is claimed is:

1. A method for engine braking on a type III valvetrain diesel engine, the method comprising:
   during a first downstroke of a reciprocating piston of the engine, deactivating a first intake valve;
   during a first upstroke of the reciprocating piston, actuating a late intake valve closing (LIVC) lift profile on a second intake valve and initiating a first engine brake lift profile on a first exhaust valve;
   during a second downstroke of the reciprocating piston, completing the first engine brake lift profile and deactivating a second exhaust valve; and
   during a second upstroke of the reciprocating piston, initiating a second engine brake lift profile on the first exhaust valve.

2. The method of claim 1, further comprising continuing the first and second engine brake lift profiles until a normal operation command is received.

3. The method of claim 2, further comprising, when the normal operation command is received:
   implementing a normal exhaust lift profile on the first exhaust valve and the second exhaust valve; and
   implementing a normal intake lift profile on the first intake valve and continuing the LIVC lift profile on the second intake valve.

4. The method of claim 2, further comprising, when the normal operation command is received:
   implementing a normal exhaust lift profile on the first exhaust valve and the second exhaust valve; and
   implementing a normal intake lift profile on the first intake valve and the second intake valve.

5. The method of claim 1, further comprising, when a LIVC command is received, implementing an intake recharge lift profile on the second intake valve during the first upstroke until a normal operation command is received.

6. The method of claim 1, wherein the first intake valve is deactivated via an intake-side lost motion spring of an intake rocker arm, and the second exhaust valve is deactivated via an exhaust-side lost motion spring of an exhaust rocker arm.

7. The method of claim 6, wherein the first and second engine brake lift profiles are initiated via an exhaust-side capsule.

8. The method of claim 7, wherein the exhaust-side capsule is actuated in a second exhaust rocker arm.

9. The method of claim 1, wherein the LIVC lift profile is initiated during the first downstroke.

10. The method of claim 1, wherein the LIVC lift profile is initiated during the first upstroke.

11. The method of claim 1, wherein the LIVC lift profile is actuated via an intake-side capsule.

12. The method of claim 11, wherein the intake-side capsule is actuated via an intake rocker arm.

13. A type III valvetrain for a diesel engine, the type III valvetrain comprising:
   a first intake valve configured to implement a normal intake lift profile;
   a second intake valve configured to implement a normal intake lift profile and to selectively implement a late intake valve closing (LIVC) lift profile;
   an intake rocker arm comprising an intake-side lost motion spring, the intake rocker arm configured to selectively deactivate the first and second intake valves via the intake-side lost motion spring;
   a first exhaust valve configured to implement a normal exhaust lift profile;
   a second exhaust valve configured to implement a normal exhaust lift profile and to selectively implement a two-stroke engine brake lift profile during a compression stroke and an exhaust stroke of the engine; and
   an exhaust rocker arm comprising an exhaust-side lost motion spring, the exhaust rocker arm configured to selectively deactivate the first and second exhaust valves via the exhaust-side lost motion spring.

14. The type III valvetrain of claim 13, wherein:
the normal intake lift profile of the first and second intake valves is implemented via an intake valve bridge; and
the LIVC lift profile of the second intake valve is implemented via an intake-side capsule.

15. The type III valvetrain of claim 13, wherein:
the normal exhaust lift profile of the first and second exhaust valves is implemented via an exhaust valve bridge; and
the two-stroke engine brake lift profile of the second exhaust valve is implemented via an exhaust-side capsule.

\* \* \* \* \*